UNITED STATES PATENT OFFICE.

KARL HAGEMANN AND OTTO STANGE, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BLACK AZO DYE AND PROCESS OF MAKING SAME.

No. 843,808.    Specification of Letters Patent.    Patented Feb. 12, 1907.

Application filed March 28, 1906. Serial No. 308,452.

*To all whom it may concern:*

Be it known that we, KARL HAGEMANN and OTTO STANGE, doctors of philosophy, chemists, citizens of the German Empire, residing at Leverkusen, near Cologne, Germany, Kingdom of Prussia, have invented new and useful Improvements in new Azo Dyes, of which the following is a specification.

We have discovered that the hitherto unknown 1-arylamino-8-naphthol-sulfonic acids—such as 1-phenylamino-8-naphthol-3-6- or 4-6- disulfonic acid, 1-paraanisylamino-8-naphthol-3-6-disulfonic acid, 1-beta-naphthylamino-8-naphthol-4-sulfonic acid, or the like—constitute valuable components for the production of azo dyestuffs. These dyestuffs are obtained by combining the 1-arylamino-8-naphthol-sulfonic acids with diazo compounds, such as the diazo derivatives of anilin, paranitranilin, naphthylamin, dichloranilin, anisidin, amidoazobenzene, amidophenols, amidophenol sulfonic acids, or the like.

The above-mentioned 1-arylamino-8-naphthol-sulfonic acids are obtained by heating 1-amino-8-naphthol-sulfonic acids—such as 1-amino-8-naphthol-3-6-, 4-6-, or 3-5- disulfonic acid, 1-amino-8-naphthol-4-sulfonic acid, or the like—with water and aromatic amins or derivatives thereof, such as anilin, toluidin, anisidin, chloroanilin, naphthylamin, or the like. The condensation may also be carried out in the presence of salts of aromatic amins or condensing agents.

The new dyestuffs obtained by the combination of diazo compounds with the 1-arylamino-8-naphthol-sulfonic acids are in the shape of their alkaline salts dark powders soluble in water with from a red to blue to black color; soluble in concentrated sulfuric acid with from a red to violet to blue color and dying wool from acid-baths from violet to blue to black shades.

In carrying out the new process practically we can proceed as follows, the parts being by weight: In an autoclave three hundred and forty-one parts of the monosodium salt of 1-amino-8-naphthol-3-6-disulfonic acid are heated with two hundred parts of anilin and one thousand parts of water to 120° centigrade for forty-eight hours. After the addition of sodium carbonate to the mass of the reaction the excess of anilin is distilled over with steam, the residual solution in the distilling-flask is neutralized, and the new 1-phenylamino-8-naphthol-3-6-disulfonic acid is precipitated therefrom by the addition of common salt, filtered off, and dried. It is thus obtained in the shape of white needles easily soluble in water and soluble with difficulty in alcohol.

The process is carried out in an analogous manner for the production of other 1-arylamino-8-naphthol-sulfonic acids.

The preparation of the dyestuffs obtainable from the 1-arylamino-8-naphthol-sulfonic acids is carried out in the usual way—*e. g.*, in the following manner, the parts being by weight: 13.8 parts of paranitranilin are diazotized in the usual manner by means of seven parts of sodium nitrite and the necessary quantity of hydrochloric acid. The diazo solution is then added while stirring to a solution of 39.6 parts of 1-phenylamino-8-naphthol-3-6-disulfonic acid, which solution contains an excess of sodium carbonate. After some hours the formation of the dyestuff is complete. The product of the reaction is heated for a short while, and the dyestuff is precipitated by the addition of common salt, filtered off, and dried. It is, after being dried and pulverized, in the shape of its sodium salt a black powder soluble in water with a violet-black color and in concentrated sulfuric acid with a red color. By reduction with stannous chlorid and hydrochloric acid para-phenylenediamin and 1-phenylamino-7-amino-8-naphthol-3-6-disulfonic acid is obtained. The new dyestuff dyes wool from acid-baths deep-black shades.

Instead of diazotized paranitranilin diazo compounds of other amins may be used.

Having now described our invention and in what manner the same is to be performed, what we claim as new, and desire to secure by Letters Patent, is—

1. The herein-described new azo dyestuffs obtainable by combining diazo compounds with 1-arylamino-8-naphthol-sulfonic acids, which dyestuffs are, after being dried and pulverized, in the shape of their alkaline salts dark powders soluble in water, soluble in concentrated sulfuric acid with from a red to violet to blue color; and dyeing wool from acid-baths from violet to blue to black shades, substantially as hereinbefore described.

2. The herein-described new azo dyestuff, which can be obtained by combining diazotized paranitranilin with 1-phenylamino-8-naphthol-3-6-disulfonic acid, which dyestuff is, after being dried and pulverized, in the shape of its sodium salt a black powder soluble in water with a violet-black and in concentrated sulfuric acid with a red color; yielding upon reduction with stannous chlorid and hydrochloric acid para-phenylenediamin and 1-phenylamino-7-amino-8-naphthol-3-6-disulfonic acid; and dyeing wool from acid-baths black shades, substantially as hereinbefore described.

In testimony whereof we have hereunto set our hands in the presence of two subscribing witnesses.

KARL HAGEMANN.
OTTO STANGE.

Witnesses:
 OTTO KÖNIG,
 ARTHUR MATTHÄUS.